June 17, 1958  M. N. ZEOLLA ET AL  2,838,809
MULTIPLE GLAZED UNITS
Filed Jan. 29, 1954

INVENTORS
MARIO N. ZEOLLA and
BY WILLIAM S. BOBEL

Oscar L. Spencer
ATTORNEY

United States Patent Office 2,838,809
Patented June 17, 1958

2,838,809
MULTIPLE GLAZED UNITS

Mario N. Zeolla and William S. Bobel, New Kensington, Pa., assignors to Pittsburgh Plate Glass Company Application January 29, 1954, Serial No. 407,024

1 Claim. (Cl. 20—56.5)

The present invention relates to multiple glazed units, and is particularly concerned with units intended for use as vision panels in refrigerated display cabinets.

Refrigerated display cases are usually provided with multiple glazed windows which comprise a plurality of sheets of glass and suitable spacer elements to maintain the glass sheets in spaced relationship. Air spaces are provided between adjacent glass sheets comprising the viewing portion of the display cabinet. These spaces are considered necessary in order to insulate the low temperature conditions within the display case from the relatively high ambient temperature conditions outside. Without at least one insulating air space, the outer surface of glass cooled by its exposure to the refrigerated conditions, tends to become fogged by condensation of moisture thereon, thus deteriorating the optical qualities of the viewing panel. Sometimes it is necessary to have a plurality of air spaces between the glass sheet exposed to the refrigerated atmosphere and the glass sheet exposed to the surrounding atmosphere in order to provide proper insulation.

In the past, refrigerated display cases provided with panels manufactured at sea level and transported to regions of high altitude for use were subject to glass, air space seal and other failures due to the pressure differential between that of the air space within the assembly and that of the surrounding atmosphere. Previously, it has been considered necessary to seal the air chambers completely during fabrication of the assembly in order to avoid ingress of moisture into the enclosed air space. We have determined that it is possible to provide a multiple glazed unit which is adequately protected from the ingress of moisture into the enclosed air chamber, while simultaneously preventing the establishment of objectionable pressure differentials found to cause failure heretofore.

A satisfactory unit for refrigerated display cases must meet the following requirements. The unit must afford clear vision despite the high temperature differential between the inside of the display case and the surrounding atmosphere. The display panel should be provided with a seal that is effective at temperatures ranging to below —30° F. This seal must also bar the entrance of atmospheric moisture into the insulating air chamber enclosed within the unit. In addition, the edges of the glass sheet comprising the unit must be suitably cushioned so as to prevent edge damage in handling and, in addition, the entire unit must be provided with sufficient flexibility for the edge components to move independently of each other when the unit is exposed to temperature and pressure conditions other than those existing during fabrication without destroying the efficiency of the air space seal.

Since units are manufactured at one location at one set of temperature and atmospheric pressure conditions, and these assemblies are shipped to all parts of the country including certain areas where the altitude varies considerably from that of the manufacturing site, it is desirable that the units be provided with a breather assembly. This breather assembly eliminates breakage of the glass sheets comprising the panel display unit due to stresses resulting from pressure differentials between the air space within the unit and the external atmosphere which would otherwise occur at high altitudes in units not supplied with a breathing assembly.

Accordingly, it is the primary object of the present invention to provide multiple glazed units suitable for use as a refrigerator display panel having the desired characteristics listed above.

This and other objects of the present invention will be better understood upon studying the following description of certain embodiments of the present invention.

Figure 1:
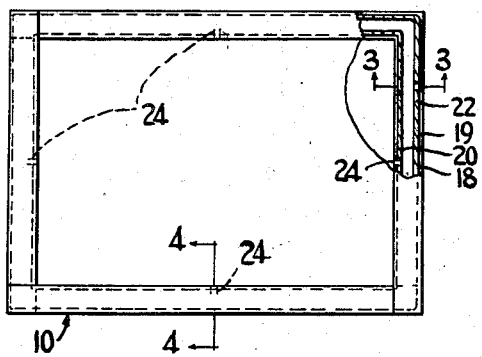
Figure 1 represents a plan view of a typical assembly according to the present invention with certain parts stripped in order to show certain features.
Figure 2:
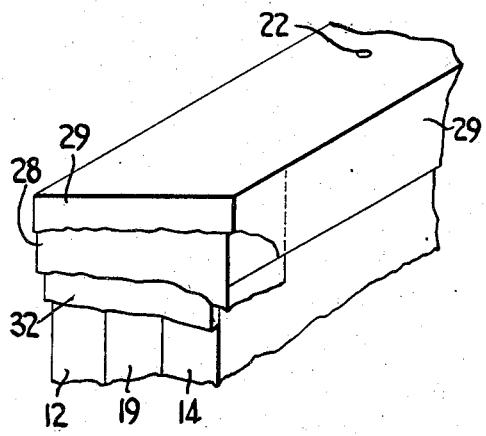
Figure 2 represents an isometric view of a corner of one embodiment of the present invention with certain portions stripped in order to show the structure more clearly.
Figure 3:
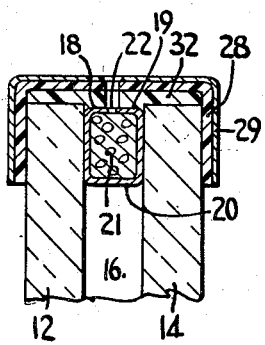
Figure 3 is a cross-sectional view taken along the lines 3—3 of Figure 1.

Referring to the drawings, Figure 1 depicts a plan view of a multiple glazed unit of the type comprising the present invention. Other views of the simplest embodiment of our present invention are shown in Figures 2, 3 and 4.

The simplest embodiment comprises a pair of spaced sheets of glass 12 and 14, and air space 16 therebetween, a peripheral spacing member 18 filled with desiccant 21 which maintains the glass sheets in spaced relationship. The spacer is preferably rectangular in cross-section to provide a peripherally extending chamber and is made of some metal preferably, such as aluminum, stainless steel or zinc plated or galvanized steel having a wall thickness between .010 and .050 inch, preferably between .010 and .035 inch. An opening 22 is provided through the outer peripheral wall 19 of the spacing member. On the inner peripheral wall 20 of the spacing member and spaced a considerable distance from opening 22, a plurality of openings 24 which communicate between the desiccant filled chamber enclosed by the spacing member and the air space 16 between adjacent glass sheets of the multiple glazed unit are provided.

Figure 4:
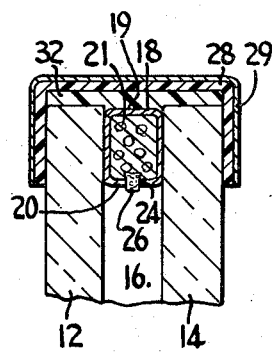
Figure 4 is a cross-sectional view taken along the lines 4—4 of Figure 1.

Referring to Figure 4, an enlarged view showing the inner peripheral opening 24 which provides communication between the desiccant 21 and the inner air space 16 is shown. Each aperture 24 is filled with a felt plug 26 to provide a means for maintaining the desiccant within the chamber enclosed by the spacing element 18. Openings 24 are drilled holes about one eighth inch in diameter and separated not more than 30 inches between centers, preferably. The number of openings 24 required depends on the size of the assembly.

The desiccant is required to be some substance suitable to remove moisture from the air within the desiccant chamber and must not be deliquescent because the formation of liquid may corrode the spacer and the liquid formed would probably enter the air space 16. Suitable substances for use as a desiccant include silica gel, calcium sulphate and activated alumina. The inner openings 24 are required to be spaced from the outer opening 22 so that when the unit "breathes" due to a change of atmospheric conditions, moist atmospheric air that enters the assembly is desiccated before it enters the air chamber 16.

Surrounding the entire assembly 10 is a thin pressure-sensitive tape 28 having a plastic, rubber, or plastic or rubber coated material backing 29. The tape backing is of an elastic, water impervious material such as polyvinyl butyral, polyethylene, rubber, etc. The adhesive tape 28 is adherent to glass and acts as a barrier against the entrance of moisture within the unit due to the condensation on its surface. The tape is continuously applied about the periphery of the unit with a folded lap joint 30 formed on the marginal edges at each corner. An aperture aligned with the aperture 22 in the spacing element is provided for the tape.

Between the peripheral tape 28 and the peripheral edge of the glass sheet an inner seal 32 of a material that provides an additional vapor barrier and a cushion for the peripheral edges of the glass is located, and also a passageway between aperture 22 of the spacing element and the aperture in the tape. This material also provides some thermal insulation along the edges of the assembly. Materials suitable for use include mastic materials such as mixtures of polyisobutylene and carbon black ranging from 60 to 75% by weight of polyisobutylene, mixtures of polyisobutylene and isobutylene-diolefin copolymers having at least 95% by weight of isobutylene, copolymers of at least 95% by weight of isobutylene and the balance diolefins such as isoprene commonly termed butyl rubber, and polyethylene.

Figure 5:
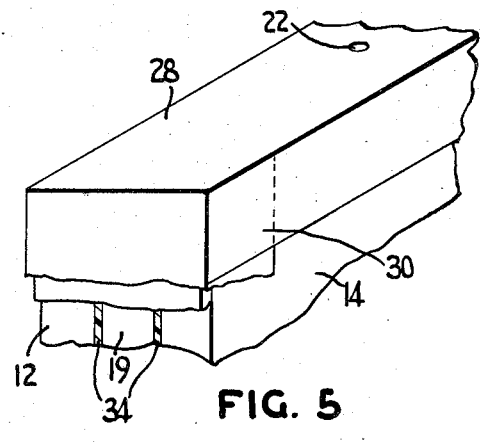
Figure 5 is an isometric view of another embodiment of the present invention similar to that shown in Figure 2.
Figure 6:
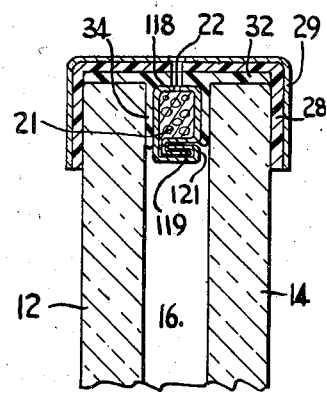
Figures 6 and 7 are cross-sectional views similar to those of Figure 3 showing certain details of still other embodiments of the present invention.
Figure 7:
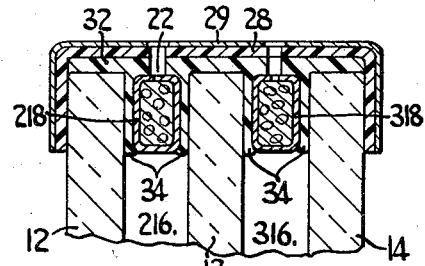

Referring to the embodiments depicted in Figures 5 and 6, it is noted that the structure herein is similar to that shown in Figures 2, 3 and 7 except that a lock-seam spacer 118 which may also be utilized in the first embodiment is substituted for the rectangular spacer 18 and an additional sealing film 34 which provides a positive seal between the individual sheets of glass and the adjacent surfaces of the spacer is included. These spacer bearing surface seals 34 extend completely around the periphery of the assembly between the spacer and the inner surfaces of the glass sheets.

A typical lock-seam spacer, such as described in co-pending application No. 279,141 of Oscar D. Englehart, filed March 28, 1952, now Patent Number 2,684,266, issued July 20, 1954, the description of which is incorporated herein by reference, is shown in cross-section in Figure 6. In such a lock-seam spacing element, the lock-seam is formed by conventional metal rolling apparatus and comprises one edge portion 119 of the metal forming the spacing element 118 having the other edge portion 121 wrapped around it. Before the seam forming operation, the edge or marginal portion 119 is knurled to provide a plurality of spaced lateral grooves therein. These grooves are provided on both faces of one of the marginal edge portions, which portion may be knurled also at its edge to provide a notched edge. Thus, a multiplicity of involved passageways having a diameter of a few thousandths of an inch is provided as a means of intercommunication between the air chamber 16 and the peripheral desiccant holding chamber formed by the separating member 118. The presently disclosed spacing element 118 departs from the structure disclosed in the co-pending Englehart application in the provision of the hole 22 which provides a means of communication between the chamber containing the desiccant 20 and the external atmosphere. The reversely directed, narrow passages formed on the internal periphery of the spacer elements perform the same function as the felt plugged apertures 24 without requiring felt plugs 26 because of their extremely small cross-sections.

The assembly depicted in detail in Figures 2, 3 and 4 is sufficient to provide adequate results when the humidity conditions are not too severe and when the items to be refrigerated are maintained at a temperature not substantially below zero degrees Fahrenheit. Such a unit is fairly inexpensive to fabricate and provides suitable results under the conditions stated. However, where the refrigerator units are exposed to higher humidity conditions or where the items are to be refrigerated at temperatures below −30° F., then it becomes a necessity to provide a unit such as that depicted in Figures 5 and 6.

In the event even greater temperature differentials are to be encountered, the structure depicted in Figure 7, wherein a plurality of air spaces are utilized for insulation and three or more sheets of glass are included to provide the plurality of air spaces, is recommended. In this embodiment, the assembly comprises glass sheets 12, 13 and 14 encompassing air chambers 216, 316, etc. Spacing elements 218, 318 etc. are provided to separate the glass sheets. Either rectangular spacers having external apertures 22 and internal apertures 24 spaced from apertures 22 or lock-seam spacers 118 provided with external apertures wherein the lock-seam provides the substitute for apertures 24 may be included with this embodiment as in the others. Tape 28, cushioning member 32, and sealing mastic seals 34 are provided as in the embodiment shown in Figures 5 and 6

The particular embodiments disclosed herein are for purposes of illustration rather than limitation. The scope of the present invention is encompassed by the accompanying claim.

What is claimed is:

For use in a refrigerated display case, a frost-free, multiple glazed, viewing closure which comprises a plurality of sheets of glass separated at their marginal edges by a hollow spacer element having inner and outer walls and extending completely around the periphery of the sheets so as to enclose an air chamber between the sheets, a desiccant in the spacer element, a strip of moisture and vapor impermeable mastic material in sealing contact with the edges of the sheets of glass and the spacer element and coextensive with the edges of the glass sheets, and a pressure sensitive tape composed of a moisture and vapor impermeable, pressure sensitive, plastic adhesive mounted on a backing of an elastic, moisture and vapor impermeable, plastic material adhered continuously around the periphery of the closure to the marginal edges of the outer glass sheets and to the mastic with a folded lap joint formed on the marginal edges at each corner, said viewing closure having an aligned opening through the tape, mastic and outer wall of the spacer element to connect the atmosphere with the desiccant and at least one other opening through the inner wall of the spacer element spaced longitudinally of the spacer element from the opening in the outer wall of the spacer element.

References Cited in the file of this patent

UNITED STATES PATENTS

| | | |
|---|---|---|
| 1,889,075 | Mills | Nov. 29, 1932 |
| 2,306,327 | Baldwin et al. | Dec. 22, 1942 |
| 2,525,717 | Ottenheimer | Oct. 10, 1950 |
| 2,597,097 | Haven | May 20, 1952 |
| 2,618,819 | Goodwillie | Nov. 25, 1952 |
| 2,684,266 | Englehart | July 20, 1954 |

FOREIGN PATENTS

| | | |
|---|---|---|
| 515,085 | Great Britain | Nov. 24, 1939 |